(12) United States Patent
Moser

(10) Patent No.: US 6,341,765 B1
(45) Date of Patent: Jan. 29, 2002

(54) METHOD FOR THE INFEED OF A FLUID INTO AN APPARATUS

(75) Inventor: Felix Moser, Winterthur (CH)

(73) Assignee: Sulzer Chemtech AG (CH)

( * ) Notice: Subject to any disclaimer, the term of this patent is extended or adjusted under 35 U.S.C. 154(b) by 0 days.

(21) Appl. No.: 09/447,098

(22) Filed: Nov. 22, 1999

(30) Foreign Application Priority Data

Dec. 15, 1998 (EP) .............................................. 98811227

(51) Int. Cl.$^7$ ................................................. B01F 3/04
(52) U.S. Cl. ........................ 261/96; 261/102; 261/105; 261/109
(58) Field of Search ........................ 261/79.2, 96, 102, 261/105, 109

(56) References Cited

U.S. PATENT DOCUMENTS

| | | | | |
|---|---|---|---|---|
| 590,640 A | * | 9/1897 | Byrne | 261/96 |
| 3,322,411 A | * | 5/1967 | Moore | 261/96 |
| 3,925,039 A | * | 12/1975 | Ziegler | 261/79.2 |
| 4,405,563 A | * | 9/1983 | Samuels | 261/96 |
| 5,106,544 A | * | 4/1992 | Lee et al. | 261/79.2 |
| 5,516,465 A | * | 5/1996 | Yeoman | 261/96 |
| 5,605,654 A | * | 2/1997 | Hsieh et al. | 261/96 |
| 5,632,933 A | | 5/1997 | Yeoman | |
| 5,648,022 A | | 7/1997 | Gohara | |
| 5,925,293 A | * | 7/1999 | Howk | 261/93 |

FOREIGN PATENT DOCUMENTS

| | | |
|---|---|---|
| DE | 2636374 | 2/1977 |
| DE | 4024588 A1 | 2/1992 |
| JP | 55092125 | 7/1980 |

* cited by examiner

Primary Examiner—C. Scott Bushey
(74) Attorney, Agent, or Firm—Brian N. Young; Townsend and Townsend and Crew LLP

(57) ABSTRACT

With the method a fluid (4) is fed into an apparatus (1), in particular into a column, in which an infeed tube (2) for the fluid opens into a deflection unit (3). This deflection unit is arranged at a vertical distance from installations (10), in particular a column packing. Two partial flows (41, 42) are formed in the deflection unit which flow largely mirror symmetrically along an inner wall of the apparatus (1) and then, after a reunion, form a backwardly moving flow (44), the horizontal velocity component of which is directed radially to the deflection unit. At least one third partial flow (43) is formed by the deflection unit which is directed radially and oppositely with respect to the backwardly moving flow of the reunited partial flows. The third partial flow is developed so strongly that the backwardly moving flow is largely prevented from flowing through the column center.

10 Claims, 3 Drawing Sheets

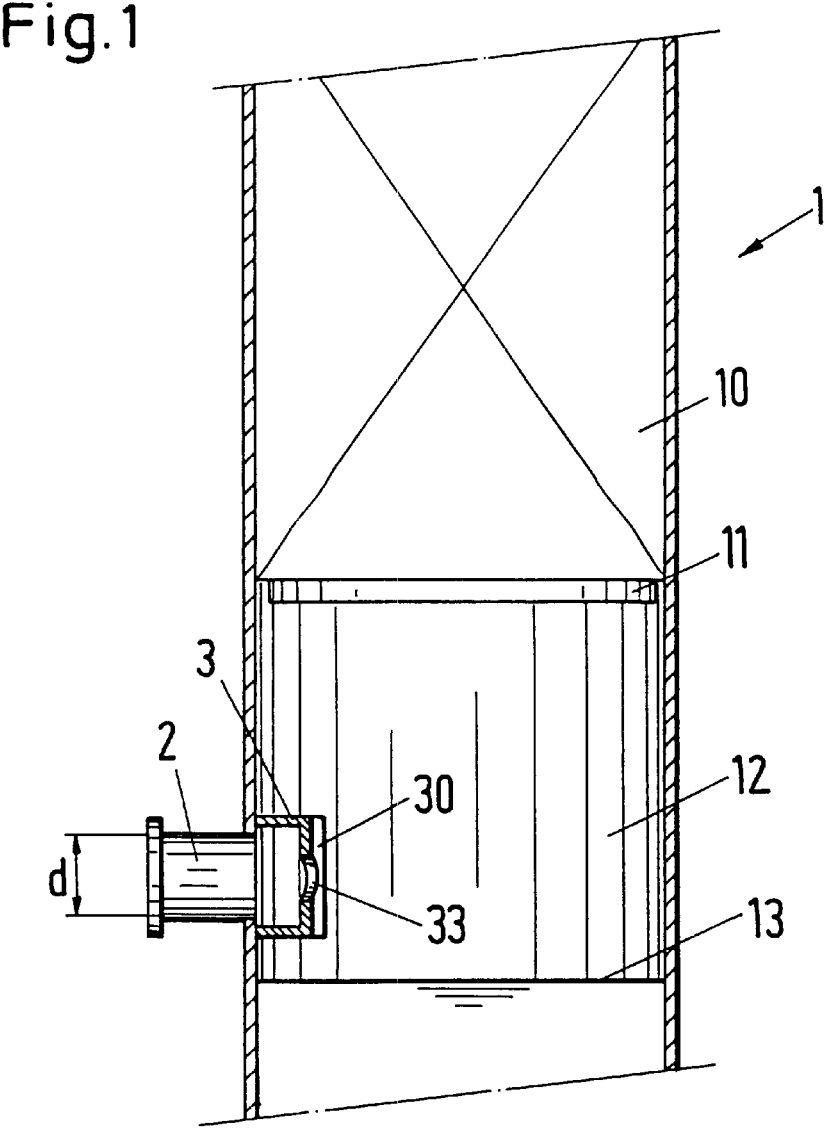
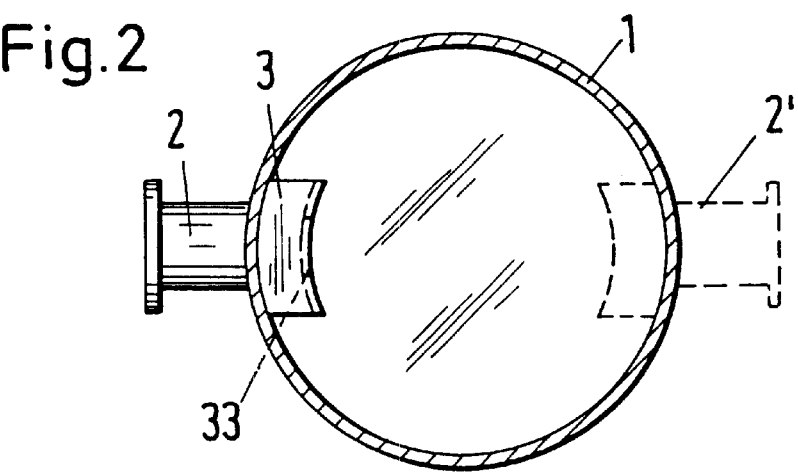

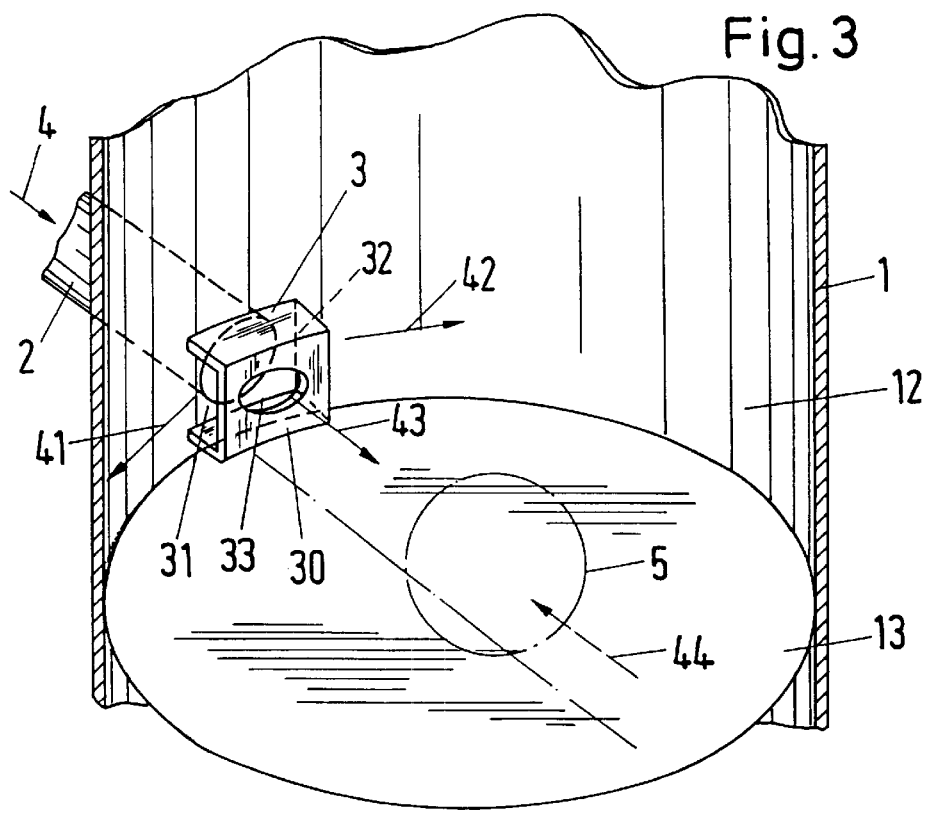
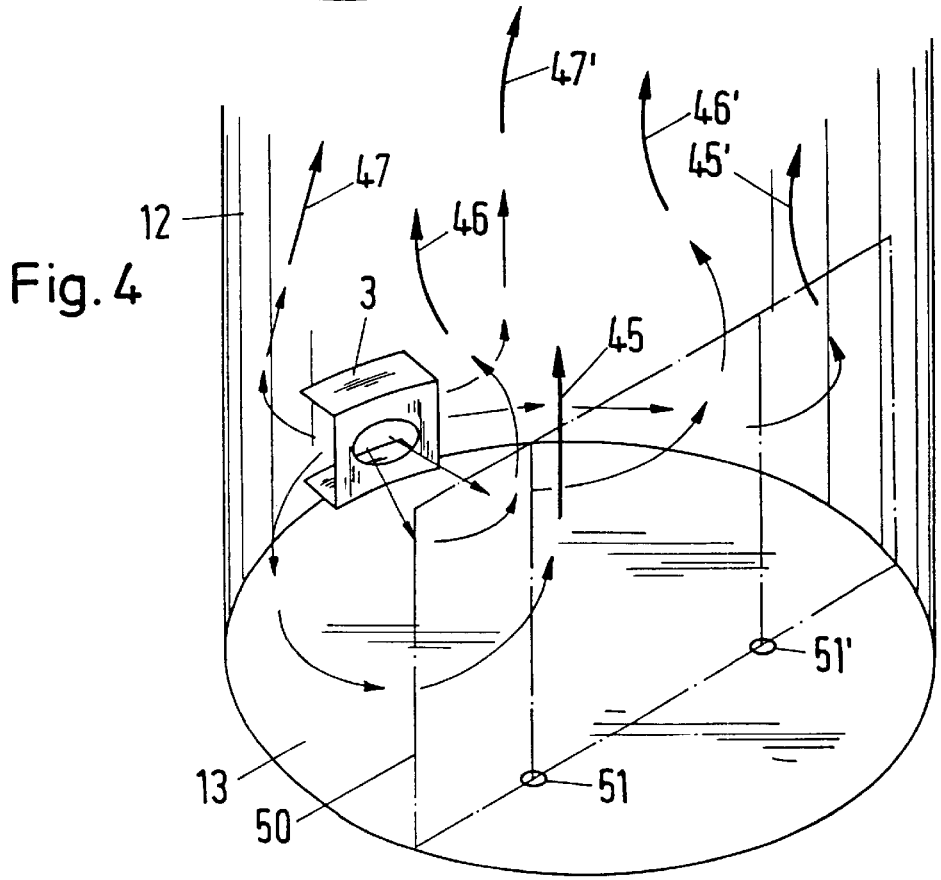

METHOD FOR THE INFEED OF A FLUID INTO AN APPARATUS

BACKGROUND OF THE INVENTION

The invention relates to a method for the infeed of a fluid into an apparatus and to a column in which the method can be carried out.

In counterflow columns which contain installations for carrying out a heat and/or material exchange between a liquid and a gas, the gas must be fed in below the installations in such a manner that it flows upwards as uniformly as possible into the installations. Various known measures can be provided—alone or in combination—for this, which however have disadvantages. These measures relate to the points at which the gas is fed in and the manner in which this is carried out: 1. A calming of the flow takes place in the space between the gas infeed point and the installations. The choice of a sufficiently large calming height would be advantageous per se, but is however often not possible for various reasons—for example due to high costs or space problems. 2. Low inflow velocities of the gas which is fed in lead to a rapid calming of the flow. They can be achieved with a large number of infeed tubes and/or large diameters of the infeed tubes, but are again as a rule not realizable for the already named reasons. 3. Special constructions which enable a uniform gas distribution are complicated and therefore expensive and/or produce large pressure losses so that low pressure applications (pressure as a rule less than 100 mbar) do not come under consideration.

A simple gas distributor is known which acts as a deflection unit on the gas flow which is fed in. This deflection unit contains a baffle plate which—arranged vertically ahead of the inlet junction of the infeed tube—is connected to the column wall by two horizontal plates above and below the inlet junction. With a deflection unit of this kind there results a distribution process in which two partial flows are formed which flow largely in mirror symmetry along the inner wall of the column and then after a reunion form a backwardly moving flow, the horizontal velocity component of which is directed radially to the deflection unit. This backwardly moving flow makes a relatively large height of the calming space above the deflection unit necessary.

SUMMARY OF THE INVENTION

It is an object of the invention to provide a method in which an improved distribution of the gas or of another fluid is possible with a simple deflection unit. This distribution should take place in a column or else in another apparatus, such as for example in a flooded solid bed reactor, in which a liquid is to be distributed above or below the solid bed.

In accordance with the invention, with the method a fluid is fed into an apparatus, in particular into a column, in which an infeed tube for the fluid opens into a deflection unit. The latter is arranged at a vertical distance from installations, in particular a column packing. Two partial flows are formed in the deflection unit which flow largely in mirror symmetry along an inner wall of the apparatus and then, after a reunion, form a backwardly moving flow, the horizontal velocity component of which is directed radially to the deflection unit. At least one third partial flow is formed by means of the deflection unit which is directed radially and oppositely with respect to the backwardly moving flow of the reunited partial flows. The third partial flow is developed so strongly that the backwardly moving flow is largely prevented from flowing through the column center.

The present invention also provides an apparatus, in particular a column, into which a fluid can be fed in accordance with the method of the invention.

BRIEF DESCRIPTION OF THE DRAWINGS

FIG. 1 shows sectionally and in longitudinal section a column with a deflection unit for a gas to be fed in which can be distributed over the column cross-section by means of the method in accordance with the invention, FIG. 2 is a cross-section through the same column, FIG. 3 is a corresponding oblique view, FIG. 4 is a qualitative illustration of the gas flow which results after the emergence from the deflection unit in the column in accordance with FIGS. 1 to 3.

DESCRIPTION OF THE PREFERRED EMBODIMENTS

Figure 5:
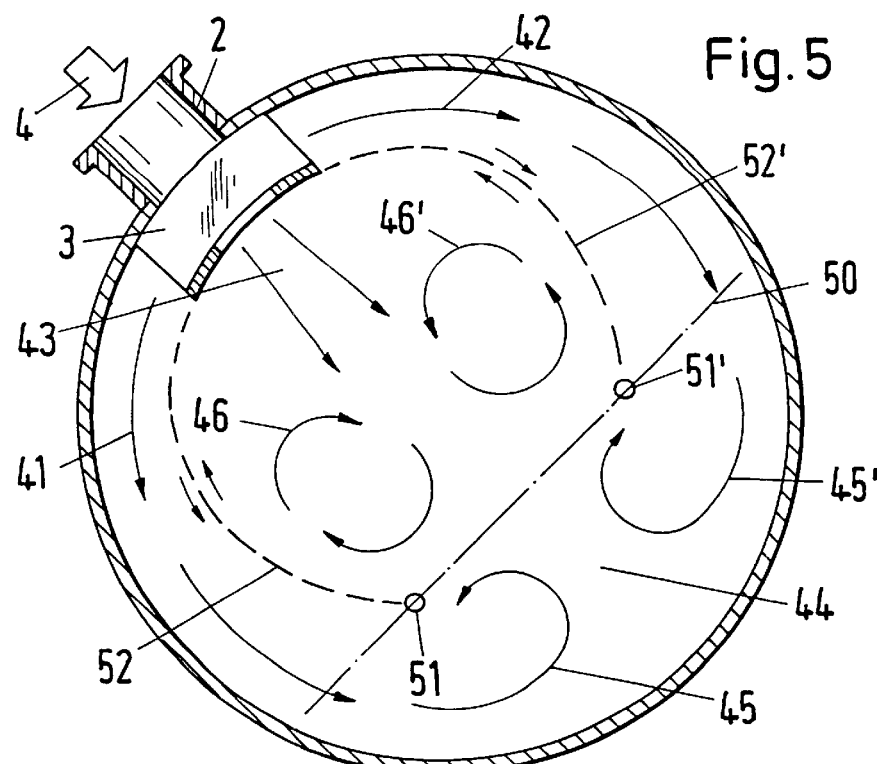
FIG. 5 is a plan view of the flow diagram of FIG. 4, and FIGS. 6–8 show further embodiments of the deflection unit.

A column 1 in accordance with FIGS. 1 to 3 contains installations 10, for example in the form of an ordered packing, in which a gas 4 and a liquid can enter into interaction and which is mounted on a carrier 11. The gas 4 is supplied via an infeed tube 2 (inner diameter d) and a deflection unit 3 into an empty space 12 between a liquid surface 13 and the carrier 11. This deflection unit 3 is the deflection unit described above with a baffle plate 30, at the center of which an aperture 33 for the emergence of a third partial flow 43 is provided, with this partial flow 43—see FIG. 3—flowing in into the space 12 (calming space) with two partial flows 41 and 42 which emerge through the lateral openings 31 and 32. The two horizontally and oppositely directed partial flows 41 and 42 move largely in mirror symmetry along the inner wall side of the column 1 and then, after a reunion, form a backwardly moving flow 44, the horizontal velocity component of which is directed radially to the deflection unit 3. The third partial flow 43 is directed radially onto the backwardly moving flow 44 of the reunited partial flows 41 and 42. The third partial flow 43 is in this so strongly developed in accordance with the invention that the backwardly moving flow 44 is upwardly deflected in a spatial region 5 in such a manner that it is largely prevented from flowing through the column center. In this the third partial flow 43 is also deflected upwardly in a corresponding manner. Through the mutual influencing of the partial flow 43 and the backwardly moving flow 44 there results a flow field in the upper region of the space 12 which is substantially more uniform in comparison with a flow field for a deflection unit 3 without aperture 33 and thus without the partial flow 43. Clearly the third partial flow 43 must not be developed so strongly that the first two partial flows 41 and 42 are prevented from reaching the point of the column wall lying opposite to the entry point.

The aperture 33 can for example have a circular, elliptic or rectangular shape. It can also be designed in a plurality of parts as a shower or a sieve plate. The third partial flow 43 is metered by the deflection unit 3 in such a manner that momenti are transported by all three partial flows 41, 42 and 43 which, on emerging from the deflection unit, are largely equally great. In this the third partial flow 43 preferably takes along a somewhat greater momentum.

FIG. 4 is an attempt to illustrate the flow field for the method in accordance with the invention. Numerous results of model calculations lie at the basis of this illustration, which are however reproduced only qualitatively here and with diverse details being neglected. The flow field is illustrated by flow lines which are represented as arrow chains. The flow lines 45 and 47 and, respectively, 45' and 47' correspond to the two partial flows 41 and 42 (FIG. 3), the flow lines 46 and 46' to the third partial flow 43 (FIG. 3). The uppermost, thick arrows all have approximately the same distance from the base surface 13. The region in which the third partial flow 43 and the backwardly moving flow 44 (see FIG. 3) collide with one another is located on the plane 50 which is illustrated in chain dotted lines. The vertical lines through the points 51 and 51' pass approximately through points at which the flow lines 45 and 46 and, respectively, 45' and 46' come the closest to one another.

FIG. 5 likewise shows the flow diagram of FIG. 4 qualitatively in a plan view. The lines 52, 52', which are drawn in there in broken lines, indicate surfaces at which the directions of the flow velocities turn around. As already mentioned, details have been neglected in the illustration, namely for example regions of the flow field in which the flow velocity is downwardly directed.

Instead of the gas 4 another fluid—namely a liquid or a gas/liquid mixture—can also be fed in with the method in accordance with the invention into the column 1. A gas or a gas/liquid mixture is supplied below the column installations 10 and indeed preferably at a distance which is so large that the vertical components of the flow velocities are largely equally great over at least two thirds of the column cross-section on entry of the fluid into the installations.

Figure 6:
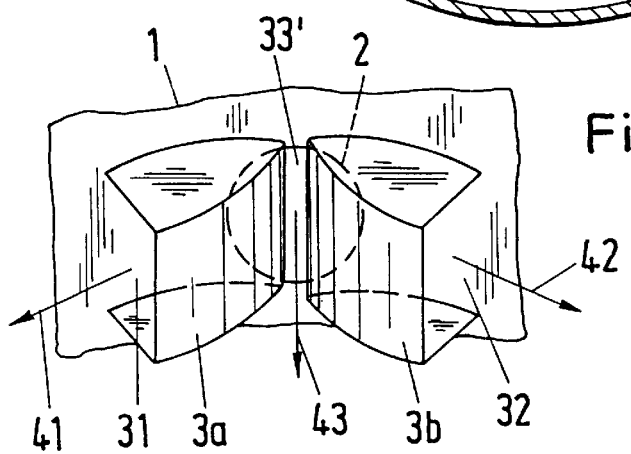
Figure 7:
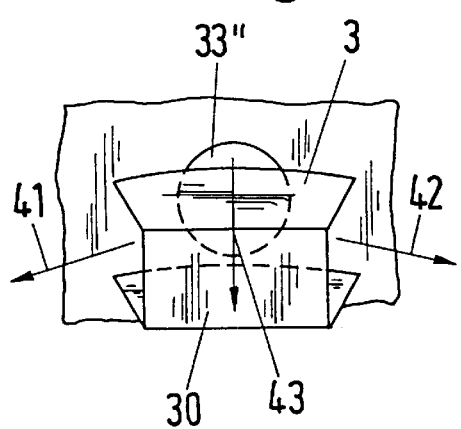
Figure 8:
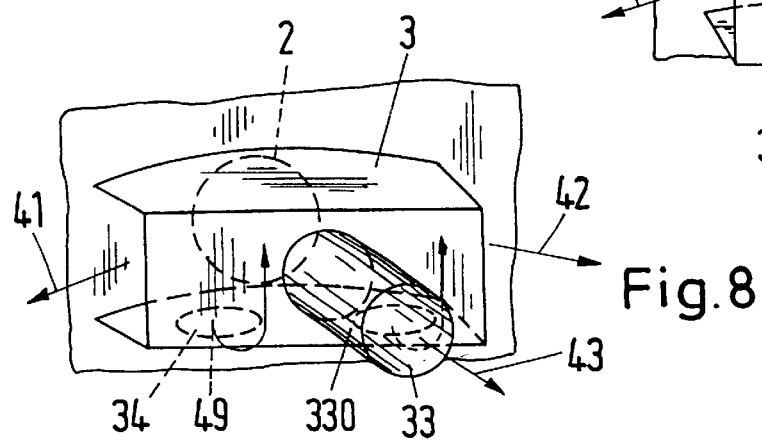

In accordance with the invention the deflection unit 3 leaves a passage 33 free between the inlet junction of the infeed tube 2 and the column center through which the third partial flow 43 can flow in radially into the column 1. FIGS. 6 to 8 show further embodiments of the deflection unit 3. In FIG. 6 the deflection unit 3 is formed by two scoop-like deflection units 3a and 3b, between which a gap 33' leaves a passage free for the third partial flow 43 directly at the inlet junction of the infeed tube 2. In FIG. 7 the baffle plate 30 is closed. Here there is again a passage 33" for the third partial flow 43 directly at the inlet junction of the infeed tube 2. In the example of FIG. 8 the third partial flow 43 is conducted via a tube 330 into the middle of the column. The deflection unit 3 can have further apertures, in particular apertures 34 which allow additional partial flows 49 to emerge below.

In order that the method in accordance with the invention yields a sufficiently good distribution of the fluid 4 which is fed in, the diameter of the column 1 must not be too large. It should be less than about 4 m, preferably less than 2 m. At the same time the diameter of the infeed tube 2 should have a valued d at the inlet junction which is greater than about 15% of the column diameter. Furthermore, the distance between the upper side of the deflection unit 3 and the carrier 11 of the installations 10 should be greater than d.

The baffle plate 30 of the deflection unit 3 is rectangular in the exemplary embodiment of FIGS. 1 to 5; it can be planar or curved. The baffle plate 30 is preferably arranged at a distance of 0.4 d to 0.8 d ahead of the inlet junction location (d=diameter of the infeed tube 2); its height amounts to from 1.2 d to 1.5 d; the distance between the vertical side edges amounts to from 1.5 d to 2 d.

If the column diameter is large, then two infeed tubes 2 and 2' (see FIG. 2) are advantageously provided in a diametral arrangement (with two similar deflection units 3 at the inlet junction points). More than two such infeed points can also be provided.

What is claimed is:

1. Method for infeed of a fluid into a column, in which an infeed tube for the fluid opens into a deflection unit which is arranged at a vertical distance from installations comprising forming two partial flows in the deflection unit which flow largely mirror symmetrically along an inner wall of the apparatus and then after a reunion form a backwardly moving flow, a horizontal velocity component of which being directed radially to the deflection unit, forming at least one third partial flow with the deflection unit and directing it radially and oppositely with respect to the backwardly moving flow of the reunited partial flows; and developing a third, sufficiently strong partial flow so that the backwardly moving flow is largely prevented from flowing through a center of the column.

2. Method in accordance with claim 1 including metering the third partial flow with the deflection unit in such a manner that moments are transported by all three partial flows leaving the deflection unit, with the third partial flow transporting a somewhat greater momentum than the two partial flows.

3. Method in accordance with claim 1 wherein the fluid is a gas or a gas/liquid mixture, the fluid is fed in below the installations, and wherein the distance between the deflection unit and the installations is sufficiently large so that at the entrance of the fluid into the installations the vertical components of the flow velocities are largely equally great over at least two-thirds of the installation cross-section.

4. A column having a cross-section which is circular comprising installations for carrying out a heat and/or material exchange between two fluids of different density, an infeed tube for the less dense fluid below the installations and comprising a deflection unit arranged at a column wall into which the infeed tube opens and by means of which the fluid which is fed in is branched into two partial flows which flow off horizontally and in opposite directions, the deflection unit leaving a passage free between an inlet junction of the infeed tube and the column center through which a third partial flow flows radially into the column.

5. A column in accordance with claim 4 wherein the deflection unit carries out its function with a baffle plate which is arranged vertically ahead of the inlet junction of the infeed tube and which is connected to the column wall by two horizontal plates above and below the inlet junction; and wherein the baffle plate has a central aperture which has a circular, elliptical or rectangular shape or which is designed in a plurality of parts as a shower.

6. A column in accordance with claim 4 wherein the column diameter is less than about 4 m, wherein the diameter of the infeed tube has a value d at the inlet junction which is greater than about 15% of the column diameter, and wherein a distance between an upper side of the deflection unit and a carrier of the installations is greater than d.

7. A column in accordance with claim 5 wherein the baffle plate of the deflection unit is at least approximately rectangular and has vertical side edges and horizontal side edges, which can also be curved; wherein the baffle plate is arranged at a distance of from 0.4 d to 0.8 d ahead of the inlet junction; wherein its height amounts to from 1.2 d to 1.5 d; and wherein the vertical side edges have a distance of from 1.5 d to 2 d.

8. A column in accordance with claim 4 comprising a plurality of infeed tubes with similar deflection units at the inlet junction points.

9. A column in accordance with claim 8 wherein two infeed tubes are provided in a diametral arrangement.

10. A column in accordance with claim 4 wherein the deflection unit has further apertures which allow partial flows to emerge below in addition.

* * * * *